United States Patent [19]
Aysola et al.

[11] Patent Number: 4,980,039
[45] Date of Patent: Dec. 25, 1990

[54] MICROWAVE-MEDIATED DEGRADATION OF PCB WASTES

[75] Inventors: Prasad Aysola, Greenfield Park; Perry D. Anderson, Lacolle; Cooper H. Langford, Anne de Lac, all of Canada

[73] Assignee: Canadian Patents & Development Ltd., Ottawa, Canada

[21] Appl. No.: 406,521

[22] Filed: Sep. 13, 1989

[30] Foreign Application Priority Data

Oct. 6, 1988 [CA] Canada ................................. 579824

[51] Int. Cl.$^5$ ..................... B01J 19/68; A61L 2/12
[52] U.S. Cl. ..................... 204/157.43; 204/157.94; 204/158.21; 422/21
[58] Field of Search ........... 204/157.43, 157.6, 157.94, 204/157.95, 157.96, 157.97, 157.98, 157.99, 158.1, 158.11, 158.12, 158.21; 422/21

[56] References Cited

U.S. PATENT DOCUMENTS

| | | | |
|---|---|---|---|
| 4,080,168 | 3/1978 | Abu-Samra | 422/68 |
| 4,345,983 | 8/1982 | Wan | 204/157.93 |
| 4,632,742 | 12/1986 | Tundo | 204/158.21 |

Primary Examiner—John F. Niebling
Assistant Examiner—Ben C. Hsing
Attorney, Agent, or Firm—Juliusz Szereszewski

[57] ABSTRACT

This is disclosed a process for the decomposition of halogenated hydrocarbons including polychlorinated biphenyls (PCB) and chlorinated pesticides, as DDT and DDE. The process comprises microwave-mediated wet-ashing of the halogenated hydrocarbons(s) in controlled conditions to avoid an emission of noxious fumes from the reaction mixture. Preferably, the wet-ashing reagent is a 1:1 mixture of nitric acid and sulfuric acid.

4 Claims, No Drawings

MICROWAVE-MEDIATED DEGRADATION OF PCB WASTES

BACKGROUND OF THE INVENTION

This invention relates to a process for decomposing certain halogenated hydrocarbons, particularly polychlorinated biphenyls, using microwave radiation.

Polychlorinated biphenyls (PCBs) have been widely used as insulating materials in electrical equipment, heat exchange liquids, plasticizers and for other industrial applications. It has been determined, however, that PCBs and other polyhalogenated organic compounds are a source of ecological problems including toxic effects on humans, animals, vegetation, soil and air. As a result, the use of PCBs is now banned in many countries including Canada and the U.S. However, safe disposal of waste PCBs still remains a problem due to the very nature of halogenated hydrocarbons, i.e. high stability to chemical and biological degradation.

A number of methods have been proposed to decompose polychlorinated biphenyls and other halogenated hydrocarbons. Some of the methods employ a high temperature treatment and therefore carry the risk of air pollution due to the emission of noxious fumes and vapors to the environment. When heated to a temperature from 300° C. to 900° C. in the presence of air, PCBs produce highly toxic dioxins. Also, incineration as a way to disposal of hazardous chemicals in general has a notable drawback in that it requires substantial energy consumption.

It has been found recently that certain decomposition reactions of halogenated organic compounds can be stimulated by the use of microwaves or other forms of radiation, e.g. UV or solar energy. U.S. Pat. No. 4,345,983 (Wan) teaches a process in which a chlorinated hydrocarbon is brought into contact with iron powder in the presence of high-intensity microwave radiation. U.S. Pat. No. 4,632,742 (Tundo) discloses a method in which an halogenated organic compound is reacted with a mixture of reactants including a polyethylene glycol, a base and a source of free radicals such as a peroxide, a persalt or a metal of high valence. The reaction is carried out in the presence of electric fields, ultrasounds or microwaves.

A combination of UV and microwave radiation as a stimulating factor in the degradation of PCBs has been taught in European patent application Ser. No. 257,170 (Tumiatti). Solar energy has been proposed in U.S. Pat. Nos. 4,432,344 and 4,549,528.

There is still a need for a safe and efficient process for the decomposition of halogenated or polyhalogenated hydrocarbons where the risks associated with high-temperature treatment would be eliminated.

SUMMARY OF THE INVENTION

According to the invention, there is provided a process for decomposing halogenated hydrocarbons which comprises reacting the halogenated hydrocarbon with a wet-ashing medium in the presence of microwave radiation.

Advantageously, the microwave energy supply to the reaction mixture should be controlled so that the temperature of the mixture does not reach a level at which a significant fuming of the mixture occurs.

The concentration of the wet-ashing medium, the power level of the microwave radiation and the duration of the reaction are controlled so as to be sufficient to effect the decomposition of the halogenated hydrocarbon.

Preferably but not exclusively, the wet-ashing medium comprises at least one strong mineral acid.

DETAILED DESCRIPTION OF THE INVENTION

Wet ashing is a known technique for oxidizing an organic matrix in the presence of an acid. It has been used heretofore for trace metal analysis in biological samples. The "traditional" procedure of wet-ashing involves acid-mediated oxidation of organic matter, i.e. animal tissue, by the convection of heat. Recently, microwaves substituted hot plates as source of heat. As a result, a considerable reduction of the process time, from hours to minutes, has been achieved.

It has now turned out unexpectedly that halogenated compounds such as PCBs or persistent chlorinated pesticides can be decomposed by using the wet-ashing technique combined with microwave stimulation.

Microwave radiation combined with acid digestion is, of course, likely to generate acid fumes and vapors which may promote the emission of digested compounds and corrosion problems. To overcome this problem of fuming, two approaches can be taken. First, sealed reaction vessels can contain the reaction mixture but they are subject to high internal pressures during microwave treatment. Therefore, costly exhaust systems must be employed to avoid explosions.

Another approach is to control the energy level of microwave radiation applied to the wet-ashing reaction mixture so that the temperature of the mixture does not exceed the level at which significant emission of fumes therefrom takes place. This can be accomplished either by a proper power setting of the microwave source, or by operating the source in a pulse mode as proposed in, e.g. U.S. Pat. No. 4,345,983. In both cases, however, the proper settings of the radiation frequency, power and time can be determined by way of experimenting due to the number of variables concomitant with microwave heating.

The decomposition of halogenated hydrocarbons will be understood, for the purpose of the invention, as a process in which a cleavage of carbon-halogen bonds takes place thus practically eliminating the toxicity problems of such hydrocarbons.

The wet-ashing media suitable for the process of the invention include strong oxidizing acids, for instance a mixture of concentrated nitric acid and sulfuric acid; concentrated perchloric acid (monohydrate); and hydrogen peroxide, preferably in a mixture with concentrated hydrochloric acid.

In the experiments as described below, a number of PCBs and pesticides was tested. Only one ashing medium was used throughout the tests. However, there is sufficient theoretical evidence to prove that other wet-ashing media, for example those indicated hereinabove, would yield satisfactory results.

EXAMPLE 1

A sample of 0.1 ml of a mineral oil spiked with 500 ppm of HCB (PCB monomer) was placed in 250 ml erlenmayer flask along with 10 ml of concentrated sulfuric acid and 10 ml of concentrated nitric acid. The mixture was stirred and the flask was placed in a wide mouth microwave oven-proof plastic container. The container was closed with a screw cap and placed in a microwave oven.

The microwave oven was operated at about 70 W and 60 Hz. Microwave radiation was applied in pulses with an on-time of 10 seconds and an off-time of 180 seconds. The total time of radiation-mediated wet-ashing, not including the off-time, was 60 seconds. The maximum temperature of the reaction mixture was about 94° C.

Following the ashing, the reaction mixture was cooled and samples thereof were extracted into n-hexane and analyzed by means of gas chromatograph with an electron capture detector. The decomposition efficiency was found to be 99%, leaving less than 1 ppm of HCB in the sample. The acid mixture was separated from the oil phase and re-used.

EXAMPLE 2

(In this and the following examples, the apparatus and the reaction conditions were similar as in Example 1 except as indicated).

The 0.1 ml sample of mineral oil contained 10000 ppm of PCB Arochlor 1260 (trademark, manufactured by Monsanto). The total wet-ashing time was 240 seconds. The decomposition efficiency was 85%.

EXAMPLE 3

The oil contained 1000 ppm of Arochlor 1260 (trademark). Total on time was 600 sec. The decomposition efficiency was 95%.

EXAMPLE 4

For the same sample as in Examples 2 and 3, the total on-time was 800 seconds. The resulting decomposition efficiency was about 100%.

EXAMPLE 5

The oil sample contained 5000 ppm of PCB Arochlor 1016 (trademark, manufactured by Monsanto). The total on-time was 60 seconds. The resulting decomposition efficiency was apparently 100% leaving no measurable PCB in the sample.

EXAMPLE 6

The mineral oil was spiked with 100 ppm of dichlorodiphenyltrichloroethane (DDT). The total radiation time was 20 seconds. The decomposition efficiency was 90%.

EXAMPLE 7

The oil sample contained 100 ppm of dichlorodiphenyldichloroethylence (DDE) and the total wet-ashing/radiation time was 20 seconds. The decomposition efficiency was 90%.

EXAMPLE 8

The oil contained 200 ppm of dimethoxydiphenyltrichloroethane (Methoxychlor). The total on-time was 20 seconds. The decomposition efficiency was 90%.

EXAMPLE 9

The oil contained 500 ppm of bromotoluene. The total on-time was 100 sec. The degradation was above 80%.

Additionally, blank tests were conducted with identical halogenated compounds at similar concentrations as in the above examples without using microwave radiation. After a comparative period of reaction with the $H_2SO_4/HNO_3$ wet-ashing reagent, no significant decomposition was found.

It is evident therefore that the combination of wet-ashing reagents and controlled microwave radiation of the invention is effective in accomplishing a substantial and relatively rapid cleavage of carbon-chlorine (halogen) bonds. It can be assumed that a number of toxic or non-toxic halogenated hydrocarbons beside these tested, can be decomposed using the process of the invention. It is however recommended, for each substance to be decontaminated, to conduct tests to determine an optimum power level, the time of microwave radiation and the concentration of the wet-ashing medium. By way of example, it has been determined that a mixture of nitric acid and sulfuric acid is effective as the ashing medium of the invention in the range of sulfuric to nitric acid from about 1:4 to 4:1 by volume, preferably at the ratio of 1:1.

It should also be noted that the decontamination process of the invention is not limited to halogenated hydrocarbons present in oil. Degradation of halogenated hydrocarbons by this invention is effective in the absence of oil.

It is conceivable, as mentioned hereinabove, to apply the microwave radiation in a continuous manner at a sufficiently low level so as not to exceed the fuming temperature while effecting a satisfactory decomposition efficiency. This goal can be achieved by ways well known in the art, e.g. by installing temperature control means connected with the microwave energy source so that the temperature of the reaction is maintained at a substantially constant level.

We claim:

1. A process for the decomposition of halogenated hydrocarbons which comprises reacting a halogenated hydrocarbon with a wet-ashing medium in the presence of microwave radiation, wherein the energy output of the microwave radiation, the concentration of the wet-ashing medium and the time of reaction are controlled to effect a substantial decomposition of the halogenated hydrocarbons while maintaining the temperature of the reaction below the level of fuming, and separating the wet-ashing medium from the product of the reaction.

2. The process according to claim 1 wherein the halogenated hydrocarbon is polychlorinated biphenyl.

3. The process according to claim 1 wherein the wet-ashing medium is a mixture of concentrated nitric acid and concentrated sulfuric acid, the volume ratio of nitric acid to sulfuric acid being from 1:4 to 4:1.

4. The process according to claim 1 wherein the wet-ashing medium is selected from a group consisting of perchloric acid and a mixture of hydrogen peroxide with hydrochloric acid.

* * * * *